United States Patent
Ishikawa et al.

(10) Patent No.: US 8,520,770 B2
(45) Date of Patent: Aug. 27, 2013

(54) AMPLITUDE SUPPRESSING APPARATUS AND SIGNAL TRANSMITTING APPARATUS

(75) Inventors: Hiroyoshi Ishikawa, Kawasaki (JP); Hajime Hamada, Kawasaki (JP); Nobukazu Fudaba, Kawasaki (JP); Yuichi Utsunomiya, Kawasaki (JP); Kazuo Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 748 days.

(21) Appl. No.: 12/404,455

(22) Filed: Mar. 16, 2009

(65) Prior Publication Data
US 2009/0316827 A1    Dec. 24, 2009

(30) Foreign Application Priority Data
Jun. 19, 2008 (JP) .................................. 2008-160183

(51) Int. Cl.
*H04L 25/49* (2006.01)

(52) U.S. Cl.
USPC .......................................... 375/296; 375/295

(58) Field of Classification Search
USPC ........................................................... 375/296
See application file for complete search history.

(56) References Cited

U.S. PATENT DOCUMENTS

| | | | | |
|---|---|---|---|---|
| 5,457,708 A * | 10/1995 | Baghdady | | 375/272 |
| 5,642,383 A * | 6/1997 | Suzuki | | 375/241 |
| 6,009,090 A | 12/1999 | Oishi et al. | | |
| 6,701,163 B1 * | 3/2004 | Hiramatsu | | 455/561 |
| 6,724,831 B1 * | 4/2004 | Hasegawa et al. | | 375/297 |
| 6,928,272 B2 * | 8/2005 | Doi | | 455/114.2 |
| 6,999,733 B2 | 2/2006 | Hori et al. | | |
| 7,020,447 B2 | 3/2006 | Nagatani et al. | | |
| 8,050,637 B2 * | 11/2011 | Shimizu et al. | | 455/114.3 |
| 8,218,521 B2 | 7/2012 | Koyanagi | | |
| 2001/0007435 A1 * | 7/2001 | Ode et al. | | 330/149 |
| 2002/0065048 A1 | 5/2002 | Nagatani et al. | | |
| 2003/0030490 A1 | 2/2003 | Nanao et al. | | |
| 2003/0104792 A1 * | 6/2003 | Doi | | 455/115 |
| 2004/0100210 A1 * | 5/2004 | Hori et al. | | 315/307 |
| 2005/0226346 A1 * | 10/2005 | Ode et al. | | 375/296 |
| 2005/0243909 A1 * | 11/2005 | Itahara et al. | | 375/240 |
| 2006/0133524 A1 | 6/2006 | Hamada et al. | | |
| 2006/0291597 A1 * | 12/2006 | Take | | 375/346 |
| 2008/0013646 A1 * | 1/2008 | Hamada et al. | | 375/297 |

(Continued)

FOREIGN PATENT DOCUMENTS

| | | |
|---|---|---|
| CN | 1503586 | 6/2004 |
| EP | 1 289 127 | 3/2003 |

(Continued)

OTHER PUBLICATIONS

B. Widrow, et al. "Plant Noise and the Filtered-x LMS Algorithm" Adaptive Signal Processing, 1985, pp. 288-292.

(Continued)

*Primary Examiner* — Chieh M Fan
*Assistant Examiner* — Santiago Garcia
(74) *Attorney, Agent, or Firm* — Katten Muchin Rosenman LLP

(57) ABSTRACT

An amplitude suppressing apparatus includes a differential circuit that calculates a differential value of amplitude of an input signal at a point when the amplitude reaches a predetermined threshold. The amplitude suppressing apparatus also includes an amplitude suppressing circuit that suppresses the amplitude of the input signal on the basis of the differential value calculated by the differential circuit.

1 Claim, 10 Drawing Sheets

(56) References Cited

U.S. PATENT DOCUMENTS

| | | | |
|---|---|---|---|
| 2009/0180574 A1* | 7/2009 | Futagi et al. ................ | 375/296 |
| 2009/0245414 A1* | 10/2009 | Okada et al. ................ | 375/295 |
| 2010/0220812 A1* | 9/2010 | Kuwabara .................... | 375/296 |
| 2010/0316041 A1 | 12/2010 | Koyanagi | |

FOREIGN PATENT DOCUMENTS

| | | |
|---|---|---|
| EP | 1 717 979 | 11/2006 |
| EP | 1 835 678 | 9/2007 |
| JP | 10-178414 | 6/1998 |
| JP | 2001-274768 | 10/2001 |
| JP | 2005-20505 | 1/2005 |
| JP | 2006-174364 | 6/2006 |
| JP | 2007-88711 | 4/2007 |
| JP | 2007-194825 | 8/2007 |
| JP | 2007-306346 | 11/2007 |
| KR | 10-2003-0013238 | 2/2003 |
| KR | 10-2006-0125520 | 12/2006 |
| WO | 01/08320 | 2/2001 |
| WO | 2008/047874 | 4/2008 |

OTHER PUBLICATIONS

Masaharu Nishimura, et al. "Active Noise Control", 2006, pp. 69-76.

Chinese Office Action dated Aug. 25, 2011, from corresponding Chinese Application No. 200910134344.0.

Korean Notice of Requesting Submission of Opinion dated Jan. 3, 2011, from the corresponding Korean Application.

European Search Report dated Dec. 2, 2009, from the corresponding European Application.

Wan-Jong Kim, et al. "An Efficient Crest Factor Reduction Technique for Wideband Applications" Analog Integrated Circuits and Signal Processing, vol. 51, No. 1, Apr. 18, 2007, pp. 19-26.

Korean Office Action dated Nov. 24, 2011, from corresponding Korean Application No. 10-2009-0029945.

Takumi Miyashita, et al. "5 GHz ΣΔ Analog-to-Digital Converter with Polarity Alternating Feedback Comparator".

Notification of Reasons for Refusal dated Jul. 10, 2012, from corresponding Japanese Application No. 2008-160183.

* cited by examiner

AMPLITUDE SUPPRESSING APPARATUS AND SIGNAL TRANSMITTING APPARATUS

CROSS-REFERENCE TO RELATED APPLICATIONS

This application is based upon and claims the benefit of priority of the prior Japanese Patent Application No. 2008-160183, filed on Jun. 19, 2008, the entire contents of which are incorporated herein by reference.

FIELD

The embodiments discussed herein are related to an amplitude suppressing apparatus that suppresses the amplitude of an input signal and a signal transmitting apparatus that transmits a signal.

BACKGROUND

In recent years, in a mobile communication system including cellular phones and base stations, a multi-carrier system that combines and transmits plural carrier signals by applying OFDM (Orthogonal Frequency Division Multiplex) or the like is adopted. In the multi-carrier system, a high peak component occurs in a combined signal at timing when phases of the respective carrier signals overlap. Therefore, in a signal transmitting apparatus that transmits a multi-carrier signal, the signal is supplied to an amplifier after a peak component of the signal is suppressed in advance, thereby the amplifier is actuated near saturation power to improve efficiency of use of power.

As a technique for suppressing a peak component of a signal, there are known, for example, a hard clip method for clipping a signal portion having amplitude larger than a threshold to the threshold and a window function method for multiplying the signal with a coefficient such that the peak component is suppressed to be equal to or lower than the threshold.

FIG. 1 is a graph for explaining a concept of peak suppression by the hard clip method. FIG. 2 is a diagram of a circuit structure for realizing the peak suppressing method illustrated in FIG. 1.

When an original signal A before the peak suppression is inputted to a hard clip section 11 illustrated in FIG. 2, the amplitude $|x(t)|$ of the signal A is calculated and compared with a suppression target value A. When the amplitude $|x(t)|$ of the signal A is smaller than the suppression target value A, the signal A sent from a delay circuit is multiplied with "1". When the amplitude $|x(t)|$ of the signal A is equal to or larger than the suppression target value A, the signal A sent from the delay circuit is multiplied with a correction amount $A/|x(t)|$. As a result, in the original signal A before the peak suppression, a portion in which amplitude exceeds the suppression target value A is clipped to the suppression target value A, and a signal B obtained by suppressing a peak component of the signal A is generated.

The hard clip method has an advantage that a peak component of a signal can be easily suppressed by a simple circuit structure. However, a high-frequency component unnecessary for the signal is produced, thereby generating a needless wave to the outside of a band. Therefore, a high-frequency component of the signal B subjected to the peak suppression by the hard clip method is cut by a filtering method.

The signal B inputted to a filtering circuit 12 illustrated in FIG. 2 is multiplied with plural filter coefficients C1, C2, ..., and Cn. Signals obtained by multiplying the signal B with the plural filter coefficients C1, C2, ..., and Cn are added up, thereby the high-frequency component is eliminated to generate a signal C.

It is possible to reduce the generation of the unnecessary wave and suppress the peak component of the signal by using both the hard clip method and the filtering method in this way. However, in order to generate the signal C with an unnecessary frequency component eliminated and a transmission signal band component accurately extracted, it is necessary to prepare a multi-dimensional filtering circuit 1B. Therefore, a circuit size and processing time increase.

As a method of preventing the increase in the circuit size and suppressing the peak component, the window function method is widely used (see, for example, Japanese Laid-open Patent Publication No. 2005-20505 and Japanese Laid-open Patent Publication No. 2007-194825).

FIG. 3 is a graph for explaining a concept of peak suppression by the window function method. FIG. 4 is a diagram of a circuit structure for realizing a peak suppressing method illustrated in FIG. 3.

An original signal A before the peak suppression inputted to a window function circuit illustrated in FIG. 4 is conveyed to an amplitude calculating section 21 in which an amplitude value of the signal A is calculated. Subsequently, the amplitude value is conveyed to a peak-position detecting section 22. The peak-position detecting section 22 repeats processing for comparing a tentative maximum value of the amplitude value with the received amplitude value to thereby finally detect a peak position of the signal A. Further, the peak-position detecting section 22 calculates a peak suppression amount on the basis of amplitude in the calculated peak position and a suppression target value A. A suppression-signal generating section 23 selects a window coefficient corresponding to the calculated peak suppression amount out of plural window coefficients stored in a window data memory 23A in advance. A multiplying section 25 multiplies the signal A conveyed from a delaying section 24 with the selected window coefficient to thereby generate a signal D with a peak component suppressed.

However, in the method illustrated in FIGS. 3 and 4, the peak suppression is started after the peak position of the original signal A is detected, resulting in an increase in a delay amount of the signal or an in crease in a buffer capacity for peak suppression processing.

SUMMARY

According to a first aspect of the invention, an amplitude suppressing apparatus includes:

a differential circuit that calculates a differential value of amplitude of an input signal at a point when the amplitude reaches a predetermined threshold; and an amplitude suppressing circuit that suppresses the amplitude of the input signal on the basis of the differential value calculated by the differential circuit.

According to a second aspect of the invention, a signal transmitting apparatus includes:

a differential circuit that calculates a differential value of amplitude of an input signal at a point when the amplitude reaches a predetermined threshold;

an amplitude suppressing circuit that suppresses, without waiting for a peak of the amplitude of the input signal, the amplitude of the input signal on the basis of the differential value calculated by the differential circuit; and a transmitting circuit that transmits a signal with amplitude suppressed by the amplitude suppressing circuit.

According to a second aspect of the invention, a signal transmitting apparatus includes:

an amplifier circuit that amplifies an input signal;

a distortion compensating circuit that is arranged at a pre-stage of the amplifier circuit and corrects the input signal such that a signal with a distortion reduced is outputted from the amplifier circuit and supplies the input signal to the amplifying circuit; and an amplitude suppressing circuit that suppresses amplitude of the input signal, wherein the distortion compensating circuit includes:

a difference arithmetic section that calculates a difference between a first signal derived from the input signal and a second signal derived from an output signal of the amplifier circuit, a differential arithmetic section that calculates a differential value of the amplitude of the input signal, and a correcting section that corrects the input signal according to a monitor value including the difference calculated by the difference arithmetic section and the differential value calculated by the differential arithmetic section, and wherein the amplitude suppressing circuit suppresses, without waiting for a peak of the amplitude of the input signal, the amplitude of the input signal on the basis of a differential value at a point when the amplitude of the input signal reaches a predetermined threshold among differential values calculated by the differential arithmetic section and supplies the input signal to the difference arithmetic section as the first signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Specific embodiments will be described below with reference to the accompanying drawings.

Figure 1:
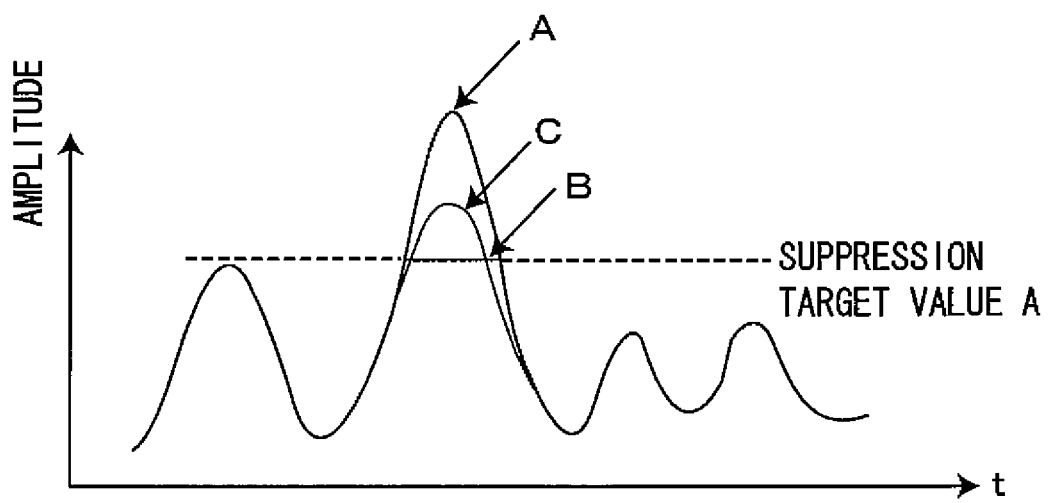
FIG. 1 is a graph for explaining a concept of peak suppression by a hard clip method.
Figure 2:
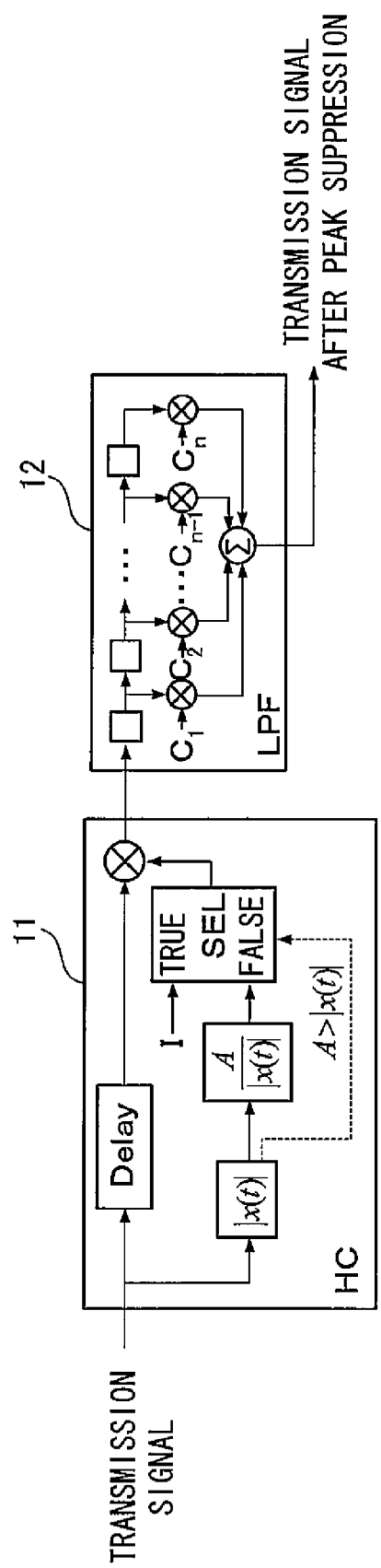
FIG. 2 is a diagram of a circuit structure for realizing a peak suppressing method illustrated in FIG. 1.
Figure 3:
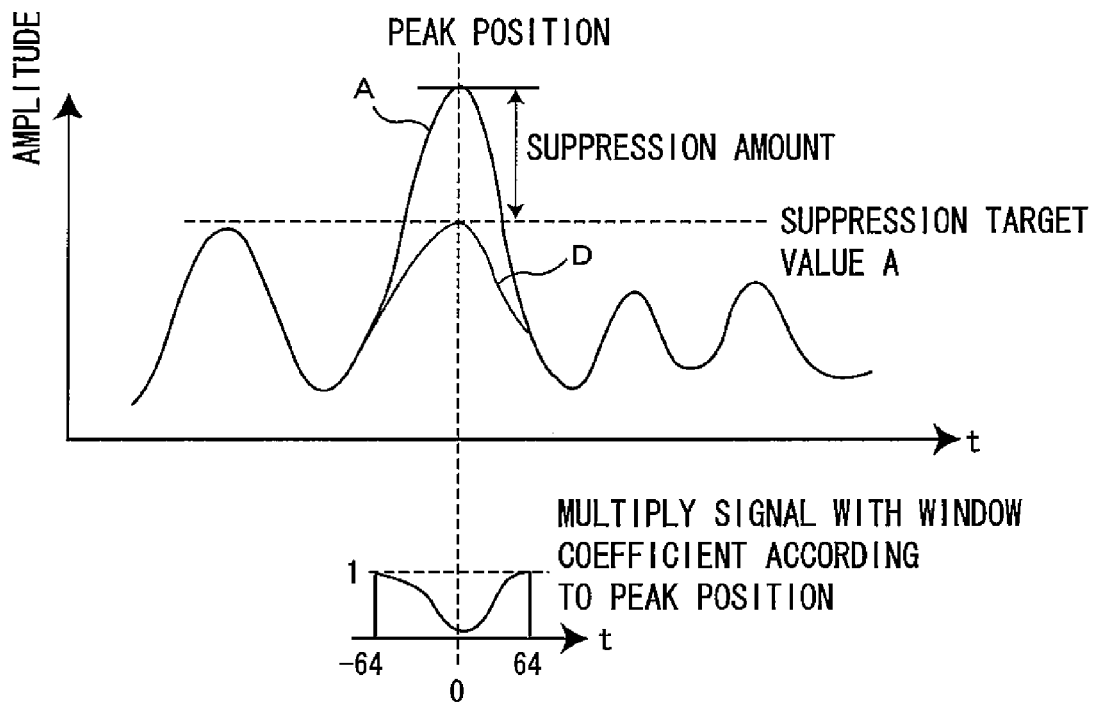
FIG. 3 is a graph for explaining a concept of peak suppression by a window function method.
Figure 4:
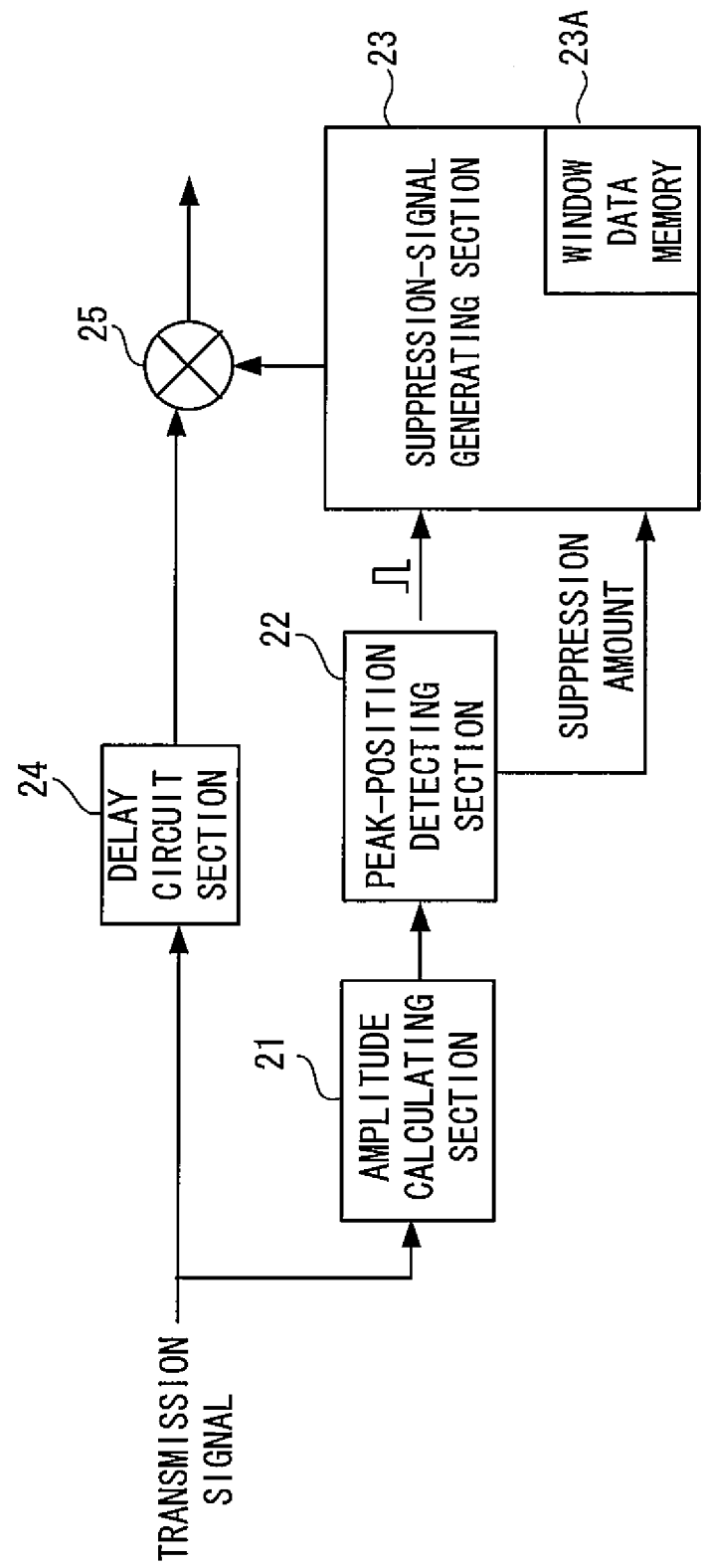
FIG. 4 is a diagram of a circuit structure for realizing a peak suppressing method illustrated in FIG. 3.
Figure 5:
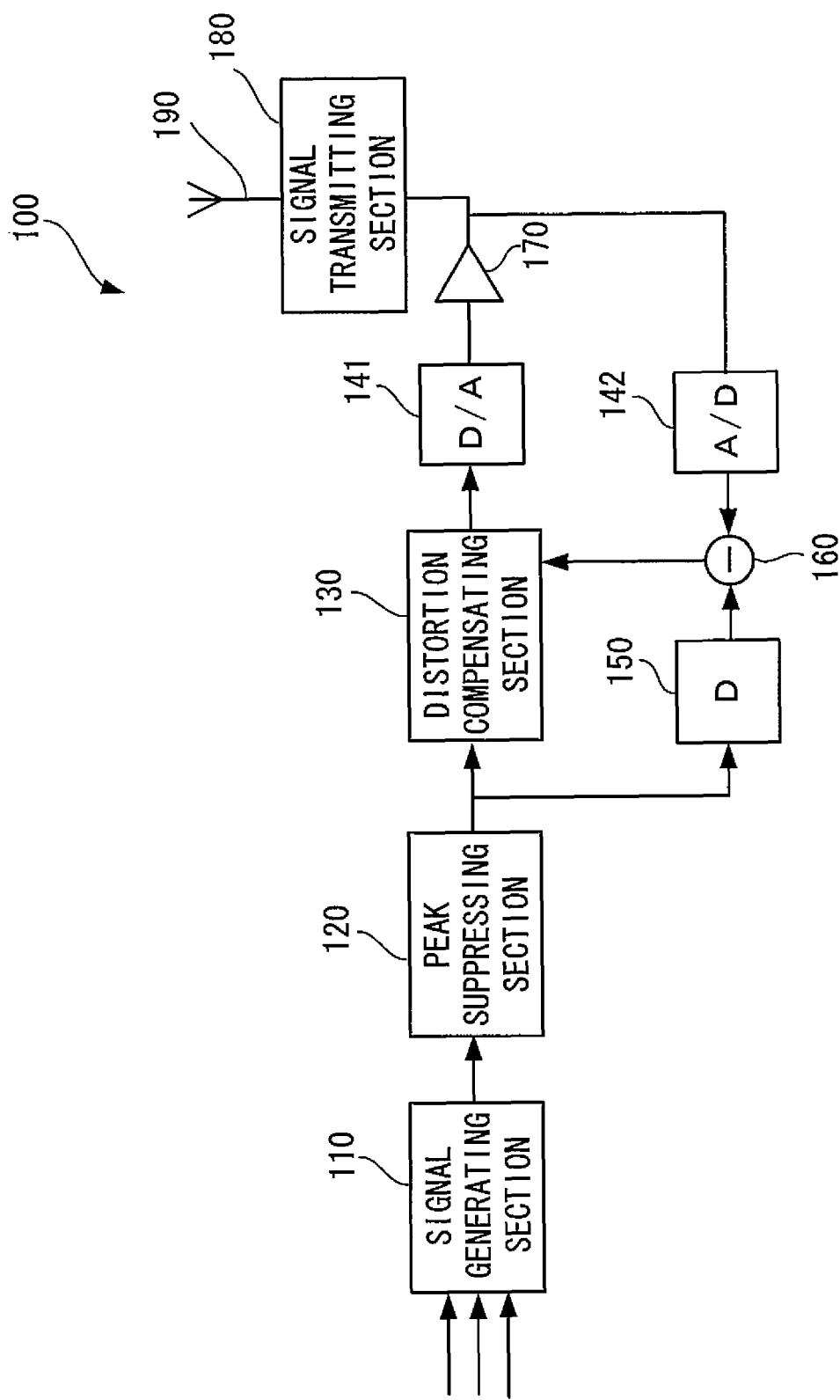
FIG. 5 is a schematic diagram of an amplitude suppressing apparatus and a signal transmitting apparatus according to a first embodiment of the present invention.

FIG. 5 is a schematic diagram of an amplitude suppressing apparatus and a signal transmitting apparatus according to a first embodiment of the present invention.

As illustrated in FIG. 5, a signal transmitting apparatus 100 includes a signal generating section 110 that generates a transmission signal, a peak suppressing section 120 that suppresses the amplitude of a signal, a D/A converting section 141 that converts a digital signal into an analog signal, a signal amplifying section 170 that amplifies a signal, an A/D converting section 142 that converts an analog signal into a digital signal, a delaying section 150 that delays an input signal inputted from the peak suppressing section 120 and conveys the input signal to a difference calculating section 160, the difference calculating section 160 that calculates a difference between the input signal from the delaying section 150 and an output signal from the signal amplifying section 170, a distortion compensating section 130 that corrects the input signal on the basis of the input signal and the difference such that an output signal with a nonlinear distortion reduced is outputted from the signal amplifying section 170, and a signal transmitting section 180 that transmits the output signal from the signal amplifying section 170 using an antenna 190. The signal transmitting section 180 is an example of the "transmitting circuit" described above in SUMMARY.

The signal generating section 110 combines plural carrier signals to generate a transmission signal. In this transmission signal, a high peak component is produced at timing when phases of respective plural carrier signals overlap. If it is attempted to directly amplify the transmission signal with the signal amplifying section 170, power efficiency is deteriorated. Therefore, the generated transmission signal is conveyed to the peak suppressing section 120 in which the amplitude of the signal is suppressed. The structure of the peak suppressing section 120 and a peak suppressing method will be described in detail later.

The signal with the amplitude suppressed by the peak suppressing section 120 (this transmission signal is hereinafter referred to as input signal) is conveyed to the distortion compensating section 130 and the delaying section 150.

The input signal conveyed to the distortion compensating section 130 is analog-converted by the D/A converting section 141 and amplified by the signal amplifying section 170. The signal amplified by the signal amplifying section 170 (this transmission signal is hereinafter referred to as output signal) is conveyed to the A/D converting section 142 as a feedback signal and, after being digital-converted, conveyed to the difference calculating section 160.

The difference calculating section 160 also receives the input signal via the delaying section 150 at the time when the output signal is conveyed thereto. A difference between the input signal and the output signal is calculated by the difference calculating section 160 and then conveyed to the distortion compensating section 130.

The distortion compensating section 130 corrects, on the basis of the input signal conveyed from the peak suppressing section 120 and the difference conveyed from the difference calculating section 160, the input signal such that a nonlinear distortion of the output signal outputted from the signal amplifying section 170 is reduced. The input signal is after the correction is analog-converted and conveyed to the signal amplifying section 170. After being amplified by the signal amplifying section 170, the input signal is transmitted by the signal transmitting section 180 via the antenna 190.

The signal transmitting apparatus 100 is configured as described above.

The structure of the peak suppressing section 120 and the peak suppressing method will be described in detail below.

Figure 6:
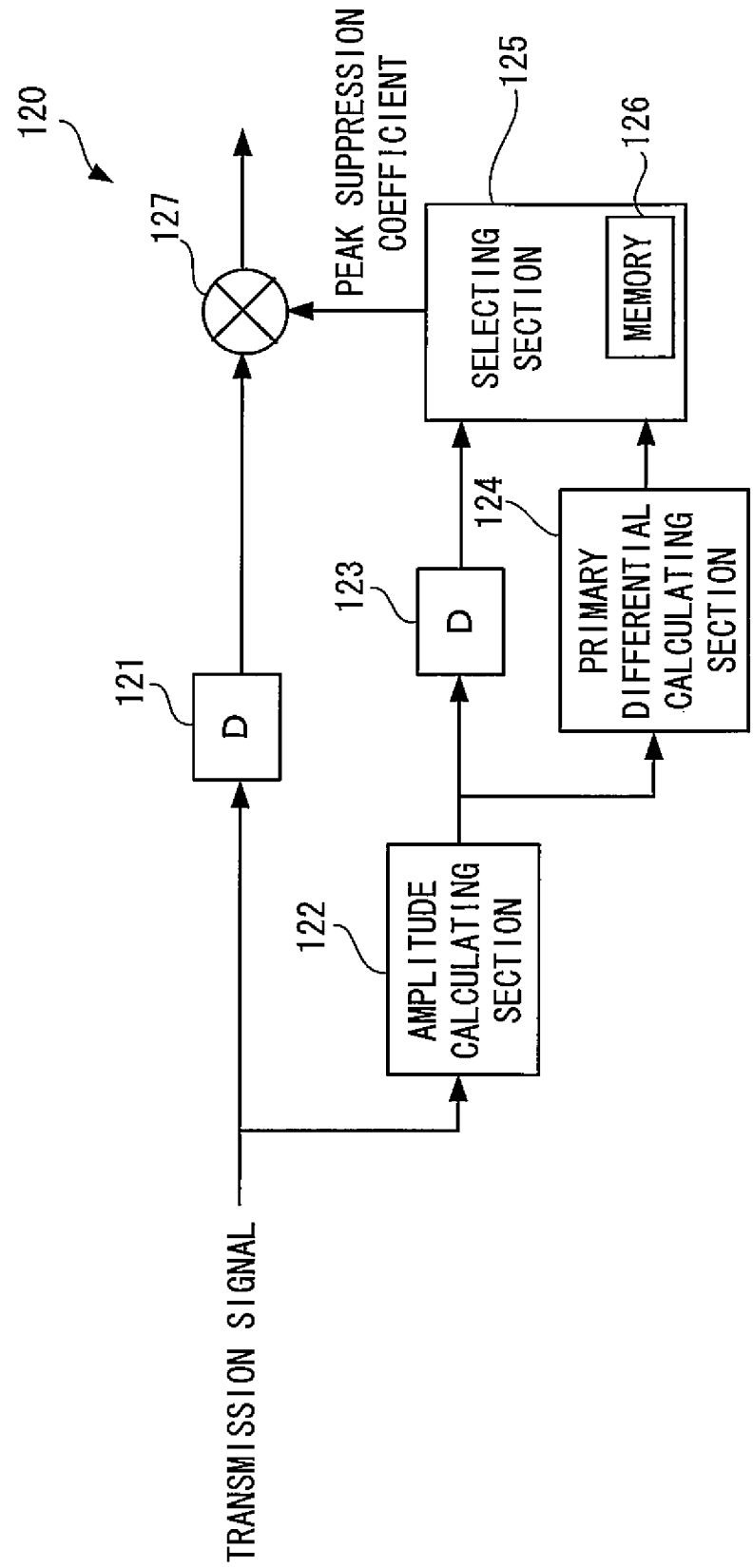
FIG. 6 is a schematic diagram of a peak suppressing section.

FIG. 6 is a schematic diagram of the peak suppressing section 120.

The peak suppressing section 120 includes an amplitude calculating section 122 that calculates the amplitude of a signal, a primary differential calculating section 124 that calculates a differential value of the amplitude of the signal and conveys the differential value to a coefficient selecting section 125, a delaying section 123 that conveys the amplitude to the coefficient selecting 35 section 125 according to a delay due to an arithmetic operation of the primary differential calculating section 124, a memory 126 in which plural window coefficients having suppression degrees of the amplitude of the signal different from one another are stored, the coefficient selecting section 125 that selects a window coefficient and conveys the window coefficient to an arithmetic section 127, a delaying section 121 that conveys the signal to the arithmetic section 127 according to a delay due to the arithmetic operation of the coefficient selecting section 125 and the like, and the arithmetic section 127 that multiplies the signal with a suppression coefficient. The primary differential calculating section 124 is an example of the "differential circuit" described above in SUMMARY. The memory 126 is an example of the "coefficient storing section". A combination of the coefficient selecting section 125 and the arithmetic section 127 is an example of the "amplitude suppressing circuit" described above in SUMMARY.

Figure 7:
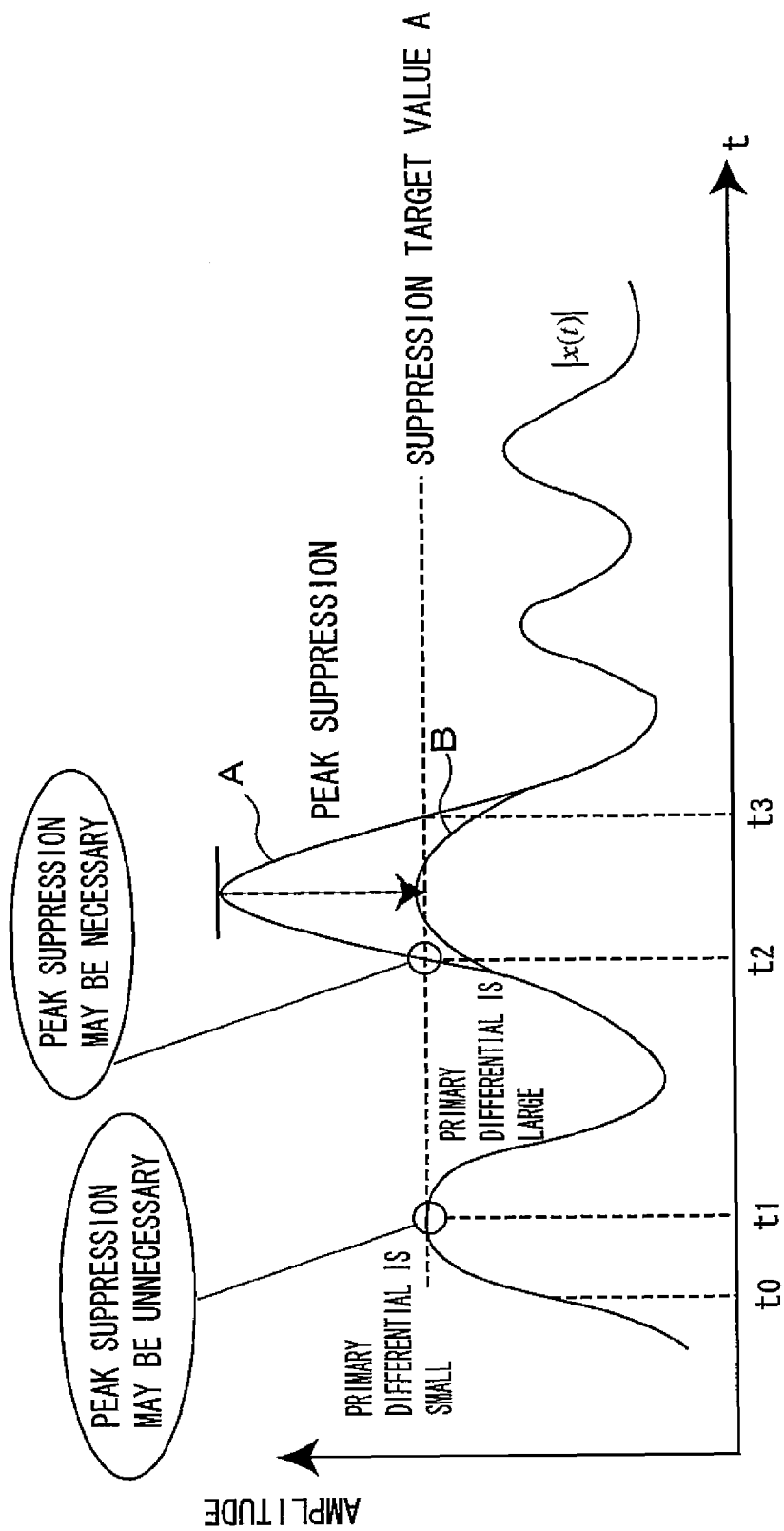
FIG. 7 is a graph for explaining a concept of a peak suppressing method in the peak suppressing section illustrated in FIG. 6.

FIG. 7 is a graph for explaining a concept of a peak suppressing method in the peak suppressing section 120 illustrated in FIG. 6.

In FIG. 7, time is associated with the horizontal axis, the amplitude of a signal is associated with the vertical axis, a signal A indicates an original transmission signal before peak suppression, and a signal B indicates a signal after the peak suppression.

A transmission signal A generated by the signal generating section 110 illustrated in FIG. 5 is conveyed to the delaying section 121 and the amplitude calculating section 122 illustrated in FIG. 6. The amplitude calculating section 122 calculates the amplitude of the transmission signal A. The primary differential calculating section 124 calculates a differential value of the amplitude of the transmission signal A. The differential value calculated by the primary differential calculating section 124 is conveyed to the coefficient selecting section 125. The amplitude calculated by the amplitude calculating section 122 is conveyed to the coefficient selecting section 125 by the delaying section 123 at timing adjusted to an arithmetic operation delay of the differential value.

Differential values of the amplitude of the signal and window coefficients are stored in the memory 126 in association with one another. In this embodiment, time during which the peak suppression is performed is set shorter as a frequency of the transmission signal A is larger, whereas the time is set longer as the frequency is smaller. A window coefficient having a larger suppression degree of the amplitude is associated with a larger differential value of the amplitude of the signal.

The coefficient selecting section 125 selects one window coefficient from the plural window coefficients stored in the memory 126 according to the amplitude conveyed from the delaying section 123 and the differential value conveyed from the primary differential calculating section 124 and conveys the window coefficient to the arithmetic section 127. In this embodiment, when the amplitude of a transmission signal is smaller than a suppression target value A, a coefficient "1" for not suppressing the amplitude of the transmission signal is selected regardless of a differential value of the amplitude of the transmission signal. When the amplitude of the transmission signal is equal to or larger than the suppression target value A, a window coefficient associated with the differential value of the amplitude of the transmission signal is selected. In other words, as the differential value of the amplitude of the transmission signal is larger, a window coefficient having a larger suppression degree of the amplitude of the transmission signal is selected.

Here, the amplitude suppression apparatus described in SUMMARY may further include a coefficient storing section that stores plural suppression coefficients having different suppression levels of the amplitude of an input signal in association with differential values calculated by the differential circuit. The amplitude suppressing circuit may suppress the amplitude of the input signal using a suppression coefficient corresponding to a differential value calculated by the differential circuit among the plural suppression coefficients stored in the coefficient storing section.

Since the plural suppression coefficients having different suppression levels of the amplitude of an input signal are stored in advance and a suppression coefficient corresponding to a differential value of the amplitude of a signal is selected, it is possible to prevent complication of a circuit and an increase in processing speed and suppress the amplitude of a signal.

Further, in the amplitude suppressing apparatus described in SUMMARY, the amplitude suppressing circuit may suppress, only for a time domain of time width corresponding to a frequency of the input signal, the amplitude of the input signal.

When the amplitude of an input signal is suppressed only for a time domain of time width corresponding to a frequency of the input signal, it is possible to determine amplitude suppression time without detecting a peak component of the input signal and it is possible to accurately suppress only a signal portion with high amplitude.

The arithmetic section 127 applies an arithmetic operation employing a window function expression including the window coefficient, which is conveyed from the coefficient selecting section 125, to the transmission signal conveyed from the delaying section 121. Consequently, the amplitude of the transmission signal is suppressed.

Further, the amplitude suppressing circuit described in SUMMARY may suppress the amplitude of the input signal by performing an arithmetic operation employing an arithmetic expression.

Furthermore, the amplitude suppressing apparatus described in SUMMARY may include a coefficient storing section that stores plural suppression coefficients having different suppression levels of the amplitude of an input signal in association with differential values calculated by the differential circuit. In this case, the amplitude suppressing circuit may perform an arithmetic operation employing an arithmetic expression including a suppression coefficient corresponding to a differential value calculated by the differential circuit among the plural suppression coefficients stored in the coefficient storing section.

Since a coefficient of the arithmetic expression is selected according to a differential value of the amplitude of a signal, it is possible to finely adjust the amplitude of the signal and suppress the amplitude.

In an example illustrated in FIG. 7, at time t0 when the amplitude of the transmission signal A is smaller than the suppression target value A, the suppression of the amplitude is not performed and a waveform of the transmission signal A is maintained. At time t1 and time t2, the amplitude of the transmission signal A exceeds the suppression target value A.

At time t1 when a primary differential value is nearly "0", the suppression of the amplitude is not performed. At time t2 when a primary differential value is large, a window coefficient having a suppression degree corresponding to the primary differential value is selected and the amplitude of the transmission signal A is suppressed to the suppression target value A by using the selected window coefficient.

It is seen that, when a primary differential value of the amplitude of a signal is small at a certain point, the amplitude of the signal does not further substantially rise and, when a primary differential value of the amplitude of a signal is large, the amplitude of the signal substantially rises. In this embodiment, presence or absence of suppression processing for a transmission signal or a suppression degree is determined according to a primary differential value of the amplitude of a signal. Therefore, it is possible to start peak suppression processing without waiting for a peak component of the transmission signal to be detected and it is possible to reduce a delay in the signal.

When amplitude is suppressed by using a function, an unnecessary wave tends to be generated on the outside of a frequency band of a signal as a suppression amount increases. It is possible to reduce an unnecessary wave component by selecting a window coefficient according to a primary differential value of the amplitude of a transmission signal and correcting the window coefficient to gently suppress the amplitude for a signal portion having a large primary differential value.

As described above, according to this embodiment, it is possible to prevent an increase in a delay amount of a signal and accurately suppress a peak component of the signal, making it possible to hold down power consumption of the signal amplifying section 170.

This concludes the description of the first embodiment. Now, a second embodiment of the present invention will be described. The second embodiment is different from the first embodiment in a method of suppressing the amplitude of a signal. However, components other than the peak suppressing section are substantially the same as those in the first embodiment. Therefore, the components same as those in the first embodiment are denoted by the same reference numerals and signs and thus, explanation of these same components will be omitted. Accordingly, only differences will be described below.

Figure 8:
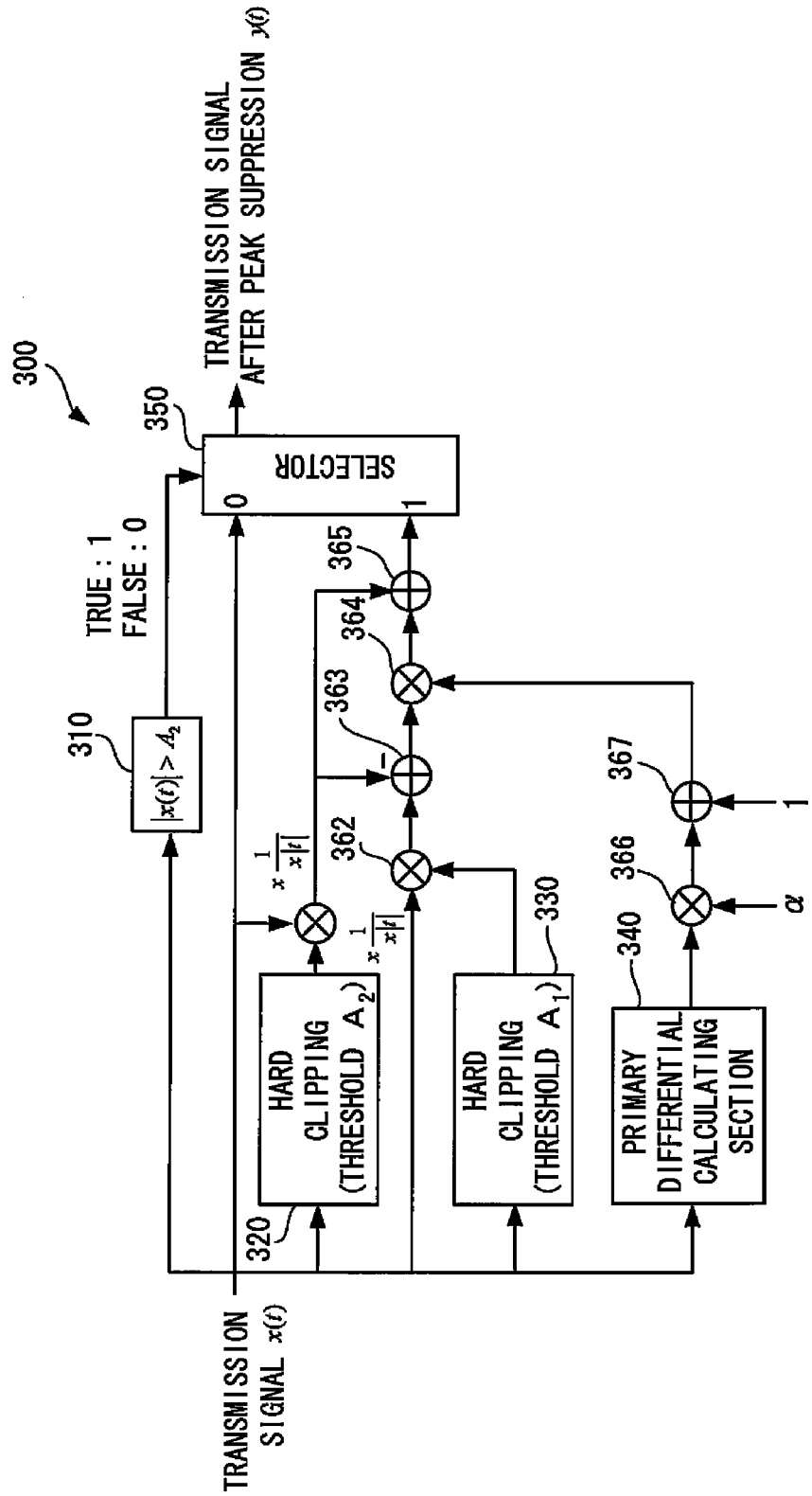
FIG. 8 is a schematic diagram of a peak suppressing section according to a second embodiment of the present invention.

FIG. 8 is a schematic diagram of a peak suppressing section 300 in the second embodiment.

The peak suppressing section 300 includes an amplitude determining section 310 that determines whether the amplitude of a signal is larger than a suppression start value A2, a second hard clipping section 320 that clips the amplitude of the signal to the suppression start value A2, a first hard clipping section 330 that clips the amplitude of the signal to a suppression target value A1, and a primary differential calculating section 340 that calculates a differential value of the amplitude of the signal. Further, the peak suppressing section 300 includes four multiplying sections 361, 362, 364, and 366, three adding sections 363, 365, and 367, and a selector 350.

A transmission signal x(t) sent to the peak suppressing section 300 is conveyed to the amplitude determining section 310.

When the amplitude |x(t)| of the transmission signal x(t) is equal to or smaller than the suppression start value A2, the transmission signal is not subjected to peak suppression and is directly conveyed to the distortion compensating section 130 and the like at a post stage.

When the amplitude |x(t)| of the transmission signal x(t) is larger than the suppression start value A2, the multiplying section 362 multiplies a signal clipped to the suppression target value A1 by the first hard clipping section 330 and a signal obtained by dividing the original transmission signal x(t) by the amplitude |x(t)| to generate a first signal. The multiplying section 361 multiplies a signal clipped to the suppression start value A2 by the second hard clipping section 320 and a signal obtained by dividing the original transmission signal x(t) by the amplitude |x(t)| to generate a second signal. After the primary differential calculating section 340 calculates a primary differential value of the transmission signal x(t) and the multiplying section 366 multiplies the primary differential value with a coefficient α, the adding section 367 adds "1" to the primary differential value multiplied with the coefficient α to generate a third signal. Further, the adding section 363 subtracts the second signal from the first signal, the multiplying section 364 multiplies a signal obtained by the subtraction and an inverse of the third signal, and the adding section 365 adds the second signal to a signal obtained by the multiplication. Consequently, a new signal with amplitude suppressed is generated.

Figure 9:
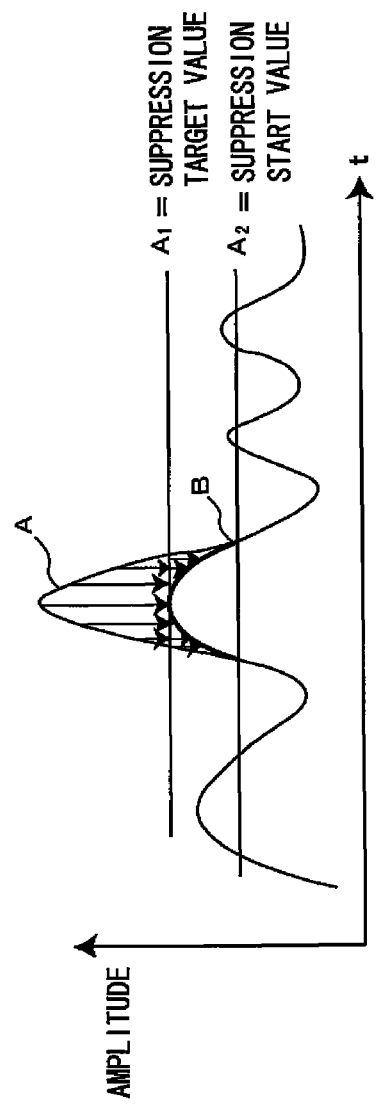
FIG. 9 is a graph for explaining a concept of a peak suppressing method in the peak suppressing section illustrated in FIG. 8.

Formula (1) indicates an arithmetic expression used in the peak suppressing section 300 illustrated in FIG. 8. FIG. 9 is a graph for explaining a concept of a peak suppressing method in the peak suppressing section 300 illustrated in FIG. 8.

$$y(t) = \left(x(t)\frac{A_1}{|x(t)|} - x(t)\frac{A_2}{|x(t)|}\right) \times \quad (|x(t)| > A2) \quad \text{[Formula 1]}$$
$$\frac{1}{\alpha||x(t)|'|+1} + x(t)\frac{A_2}{|x(t)|}$$
$$y(t) = x(t) \qquad (|x(t)| = < A2)$$

In FIG. 9, time is associated with the horizontal axis, the amplitude of a signal is associated with the vertical axis, a signal A indicates an original transmission signal before peak suppression, and a signal B indicates a signal after the peak suppression. As illustrated in FIG. 9, the peak suppressing section 300 illustrated in FIG. 8 suppresses the amplitude to be equal to or lower than the suppression target value A1 only for a portion of the transmission signal x(t) in which the amplitude |x(t)| exceeds the suppression start value A2.

Here, in the amplitude suppressing apparatus described above in SUMMARY, the amplitude suppressing circuit may suppress, only for a time domain in which the amplitude of the input signal exceeds a threshold, the amplitude of an input signal.

In this case, since the amplitude of a signal is suppressed only for a time domain in which the amplitude of the signal exceeds the threshold, it is possible to maintain an original signal as much as possible and improve power efficiency of the amplifier circuit.

Arithmetic processing is applied to a transmission signal according to Formula (1) in this way. This makes it possible to accurately suppress the amplitude of the signal to be equal to or lower than the suppression target value A1 by a degree corresponding to the amplitude only for a portion in which the amplitude exceeds the suppression start value A2.

This concludes the description of the second embodiment. Now, a third embodiment of the present invention will be described. The third embodiment is different from the first embodiment in a position where the peak suppressing section is arranged. In the following explanation, components same as those in the first embodiment are denoted by the same reference numerals and signs and thus, explanation of these components will be omitted. Only differences will be described below.

Figure 10:
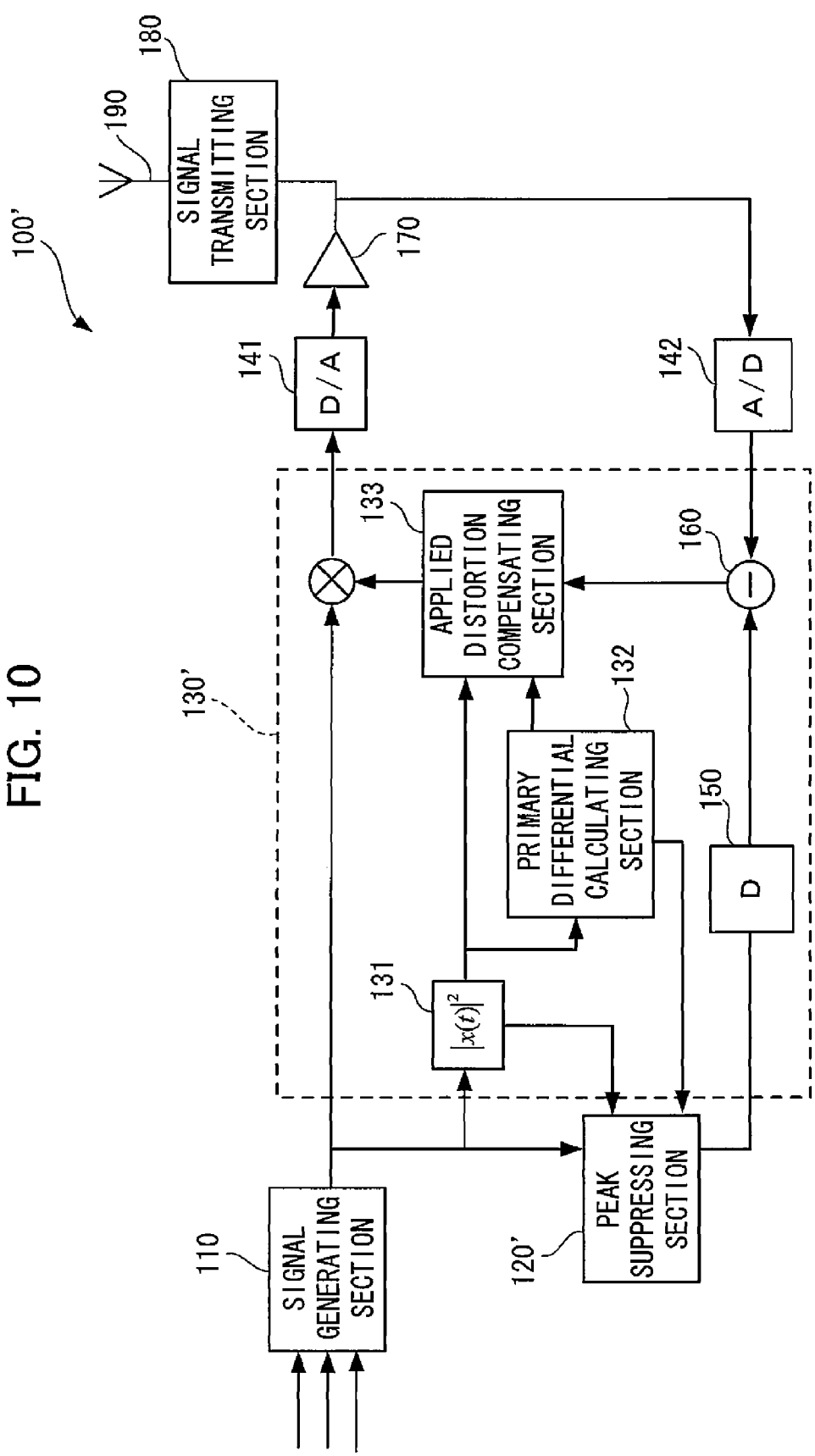
FIG. 10 is a schematic diagram of a signal transmitting apparatus according to a third embodiment of the present invention.

FIG. 10 is a schematic diagram of a signal transmitting apparatus according to the third embodiment.

As illustrated in FIG. 10, like the signal transmitting apparatus 100 according to the first embodiment illustrated in FIG. 5, a signal transmitting apparatus 100' includes the signal generating section 110, the D/A converting section 141, the signal amplifying section 170, the A/D converting section 142, and the signal transmitting section 180. Further, the signal transmitting apparatus 100' includes a peak suppressing section 120' including the coefficient selecting section 125 and the arithmetic section 127 of the peak suppressing section 120 according to the first embodiment illustrated in FIG. 6 and a distortion compensating section 130' including the delaying section 150, the difference calculating section 160, an amplitude calculating section 131, a primary differential calculating section 132, and an applied distortion compensating section 133. The signal amplifying section 170 is an example of the amplifier circuit described above. The distortion compensating section 130' is an example of the "distortion compensating circuit" described above in SUMMARY. The primary differential calculating section 132 is an example of the "differential arithmetic section" described above in SUMMARY. The difference calculating section 160 is an example of the "difference arithmetic section" described above in SUMMARY. The applied distortion compensating section 133 is an example of the "correcting section" described above in SUMMARY.

The amplitude calculating section 131 calculates the amplitude of a transmission signal generated by the signal generating section 110. The primary differential calculating section 132 calculates a differential value of the amplitude. The calculated amplitude and the calculated primary differential value are conveyed to the applied distortion compensating section 133 and conveyed to the peak suppressing section 120' as well.

The difference calculating section 160 calculates a difference between a feedback signal of a signal amplified by the signal amplifying section 170 and the transmission signal supplied from the peak suppressing section 120', and conveys the difference to the applied distortion compensating section 133.

The applied distortion compensating section 133 performs distortion compensation processing according to a predetermined applied algorism using the amplitude calculated by the amplitude calculating section 131, the differential value calculated by the primary differential calculating section 132, and the difference calculated by the difference calculating section 160. In other words, a nonlinear distortion as a distortion of input and output properties of the signal amplifying section 170 is corrected on the basis of the amplitude and the primary differential value of the transmission signal. A distortion (a memory effect) caused by hysteresis decrease is corrected on the basis of the primary differential value. An input signal subjected to distortion compensation by the applied distortion compensating section 133 is transmitted after being conveyed to the signal amplifying section 170 and amplified.

The peak suppressing section 120' selects a window coefficient, which is stored in the memory 126, on the basis of the amplitude conveyed from the amplitude calculating section 131 and the differential value conveyed from the primary differential calculating section 132 and suppresses the amplitude of the transmission signal using the selected window coefficient.

In this way, a peak suppressing circuit is incorporated in a feedback loop of the distortion compensating circuit. This makes it possible to divert the amplitude and a differential value of an input signal calculated by the distortion compensating circuit to the peak suppressing circuit, suppress an increase in circuit size, and reduce a delay of a signal.

In the above-described embodiments, a suppression degree of amplitude is changed on the basis of a differential value of the amplitude of a signal. However, only presence or absence of execution of amplitude suppression processing may be determined on the basis of the differential value of the amplitude of the signal to execute the amplitude suppression processing in the past.

When a differential value of amplitude at a point when the input signal reaches the predetermined threshold is plus, the amplitude of the input signal is considered to rise exceeding the threshold. Otherwise, the amplitude of the input signal is considered not to further rise. In this way, it is possible to predict necessity of peak suppression and a suppression degree of a peak component according to the differential value of the amplitude at the point when the input signal reaches the predetermined threshold.

According to the amplitude suppressing apparatus of the invention, the amplitude of the input signal is suppressed on the basis of the differential value of the amplitude at the point when the amplitude of the input signal reaches the predetermined threshold. Therefore, it is possible to reduce time for waiting for the amplitude of the input signal to reach a peak and it is possible to increase speed of processing.

Further, according to the signal transmitting apparatus of a first type, it is possible to suppress amplitude without waiting for the peak of the amplitude of the input signal and it is possible to reduce a delay in the signal.

Usually, in general, a signal transmitting apparatus is mounted with an amplifier circuit that amplifies a signal and a distortion compensating circuit that reduces a nonlinear distortion of the signal outputted from the amplifier circuit. The distortion compensating circuit corrects an input signal such that the nonlinear distortion of the output signal is reduced using a difference between a first signal derived from the input signal and a second signal derived from the output signal of the amplifier circuit and the amplitude and a differential value of the input signal.

Furthermore, according to the signal transmitting apparatus of a second type, the amplitude and the differential value of the input signal calculated by the distortion compensating circuit are diverted to the amplitude compression circuit. Therefore, it is possible to prevent an increase in circuit size and it is possible to reduce a delay in a signal.

As described above, with the amplitude suppressing apparatus and the signal transmitting apparatus disclosed herein, it is possible to prevent an increase in a delay amount of a signal and a buffer capacity and suppress a peak component of the signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal transmitting apparatus comprising:
an amplitude suppressing circuit that suppresses an amplitude of an input signal, without waiting for a peak of the amplitude of the input signal; and
a transmitting circuit that transmits a signal whose amplitude is suppressed by the amplitude suppressing circuit, wherein
the amplitude suppressing circuit performs suppression in accordance with an equation of:

$$y(t) = \left(x(t)\frac{A_1}{|x(t)|} - x(t)\frac{A_2}{|x(t)|}\right) \times \frac{1}{\alpha||x(t)|'| + 1} + x(t)\frac{A_2}{|x(t)|} \quad (|x(t)| > A2)$$

$$y(t) = x(t) \quad (|x(t)| =< A2),$$

where x(t) represents the amplitude of the input signal at time t, $|x(t)|'$ represents the first derivative of the absolute value of x(t) at time t, $A_1$ represents a suppression target value, $A_2$ represents a suppression start position, α represents a coefficient larger than 1, and y(t) represents an amplitude of a suppressed signal.

* * * * *